US012798006B2

(12) United States Patent
Pan et al.

(10) Patent No.: US 12,798,006 B2
(45) Date of Patent: Nov. 17, 2026

(54) DIFFERENT-STRENGTH STEEL WELDING COMPONENT WITH ALUMINUM OR ALUMINUM-ALLOY PLATING AND METHOD FOR MANUFACTURING SAME

(71) Applicant: BAOSHAN IRON & STEEL CO., LTD., Shanghai (CN)

(72) Inventors: Hua Pan, Shanghai (CN); Chengjie Liu, Shanghai (CN); Ming Lei, Shanghai (CN); Yue Wu, Shanghai (CN); Zhongqu Sun, Shanghai (CN); Haomin Jiang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 778 days.

(21) Appl. No.: 17/598,007

(22) PCT Filed: Mar. 27, 2020

(86) PCT No.: PCT/CN2020/081743
§ 371 (c)(1),
(2) Date: Sep. 24, 2021

(87) PCT Pub. No.: WO2020/200110
PCT Pub. Date: Oct. 8, 2020

(65) Prior Publication Data

US 2022/0168845 A1 Jun. 2, 2022

(30) Foreign Application Priority Data

Mar. 29, 2019 (CN) ........................ 201910249188.6

(51) Int. Cl.
*B23K 26/322* (2014.01)
*B23K 9/00* (2006.01)
(Continued)

(52) U.S. Cl.
CPC .......... *B23K 26/322* (2013.01); *B23K 9/0026* (2013.01); *B23K 9/16* (2013.01);
(Continued)

(58) Field of Classification Search
CPC ...... B23K 26/322; B23K 9/0026; B23K 9/16; B23K 9/173; B23K 9/232; B23K 26/123;
(Continued)

(56) References Cited

U.S. PATENT DOCUMENTS 8,614,008 B2 * 12/2013 Canourgues ........... C21D 6/005 428/653
10,543,565 B2 * 1/2020 Breuer .................. B32B 15/012
(Continued)

FOREIGN PATENT DOCUMENTS

CN 104023899 A 9/2014
CN 105163895 A 12/2015
(Continued)

OTHER PUBLICATIONS

Machine English Translation of JP-2006021224-A (Year: 2006).*
(Continued)

*Primary Examiner* — Erwin J Wunderlich
(74) *Attorney, Agent, or Firm* — Lei Fang, Esq.; Smith Tempel Blaha LLC

(57) ABSTRACT

Disclosed is a different-strength steel welding component with an aluminum or aluminum-alloy plating formed by means of butt welding of a high-strength steel plate and a low-strength steel plate, and each of the high-strength steel plate and the low-strength steel plate comprises a base body and at least one pure aluminum or aluminum-alloy plating on a surface of the base body. The tensile strength of a welding seam of the welding component after hot stamping is greater than the tensile strength of a low-strength steel base metal, and the elongation is greater than 4%, such that
(Continued)

application requirements of the welding component in the field of automobile hot stamping are met. The present disclosure also relates to a method for manufacturing a different-strength steel welding component with an aluminum or aluminum-alloy plating and a welding wire used in the method.

19 Claims, 3 Drawing Sheets

(51) Int. Cl.

| | |
|---|---|
| ***B23K 9/16*** | (2006.01) |
| ***B23K 9/173*** | (2006.01) |
| ***B23K 9/23*** | (2006.01) |
| ***B23K 26/12*** | (2014.01) |
| ***B23K 26/211*** | (2014.01) |
| ***B23K 26/24*** | (2014.01) |
| ***B23K 26/242*** | (2014.01) |
| ***B23K 26/323*** | (2014.01) |
| ***B23K 35/02*** | (2006.01) |
| ***B23K 35/30*** | (2006.01) |
| ***B23K 35/38*** | (2006.01) |
| ***B23K 35/40*** | (2006.01) |
| *B23K 101/00* | (2006.01) |
| *B23K 101/18* | (2006.01) |
| *B23K 101/34* | (2006.01) |
| *B23K 103/04* | (2006.01) |
| *B23K 103/20* | (2006.01) |

(52) U.S. Cl.

CPC .............. *B23K 9/173* (2013.01); *B23K 9/232* (2013.01); *B23K 26/123* (2013.01); *B23K 26/125* (2013.01); *B23K 26/211* (2015.10); *B23K 26/24* (2013.01); *B23K 26/242* (2015.10); *B23K 26/323* (2015.10); *B23K 35/0261* (2013.01); *B23K 35/3073* (2013.01); *B23K 35/383* (2013.01); *B23K 35/40* (2013.01); *B23K 2101/006* (2018.08); *B23K 2101/18* (2018.08); *B23K 2101/34* (2018.08); *B23K 2103/04* (2018.08); *B23K 2103/20* (2018.08)

(58) Field of Classification Search

CPC .... B23K 26/125; B23K 26/211; B23K 26/24; B23K 26/323; B23K 35/3073; B23K 35/383; B23K 2101/006; B23K 2101/34; B23K 2103/04; B23K 2103/20; B23K 26/242; B23K 35/0261; B23K 35/40; B23K 2101/18

See application file for complete search history.

(56) References Cited

U.S. PATENT DOCUMENTS

| | | | | |
|---|---|---|---|---|
| 2004/0200813 | A1 | 10/2004 | Alips et al. | |
| 2005/0155960 | A1* | 7/2005 | Bonnet | B23K 35/3053 219/137 WM |
| 2009/0261085 | A1* | 10/2009 | Suzuki | B23K 35/362 219/145.22 |
| 2011/0209800 | A1* | 9/2011 | Kim | C21D 8/0405 148/330 |
| 2012/0325787 | A1* | 12/2012 | Hamada | B23K 26/123 219/121.64 |
| 2014/0144893 | A1* | 5/2014 | Yang | B23K 9/0026 219/137 R |
| 2014/0154521 | A1* | 6/2014 | Kwon | B23K 26/32 219/121.64 |
| 2014/0305921 | A1* | 10/2014 | Kawasaki | B23K 35/3033 420/448 |
| 2015/0034615 | A1 | 2/2015 | Luzius et al. | |
| 2015/0099140 | A1* | 4/2015 | Amata | B23K 35/3618 219/146.1 |
| 2015/0314400 | A1* | 11/2015 | Nako | C22C 38/001 420/108 |
| 2016/0008906 | A1* | 1/2016 | Zeniya | C22C 38/04 219/146.1 |
| 2016/0045970 | A1* | 2/2016 | Garcia | B23K 35/38 219/121.64 |
| 2016/0107270 | A1* | 4/2016 | Barhorst | B23K 35/404 219/146.24 |
| 2016/0199892 | A1* | 7/2016 | Ko | C21D 8/0263 72/201 |
| 2016/0319408 | A1* | 11/2016 | Jeong | B23K 35/3073 |
| 2016/0368094 | A1* | 12/2016 | Breuer | B23K 35/3073 |
| 2017/0165793 | A1* | 6/2017 | Barhorst | B23K 35/0266 |
| 2018/0126437 | A1* | 5/2018 | Miyazaki | C22C 38/04 |
| 2018/0326538 | A1* | 11/2018 | Breuer | C22C 38/06 |
| 2021/0053154 | A1* | 2/2021 | Schmit | C21D 9/50 |
| 2021/0078106 | A1* | 3/2021 | Gu | B23K 26/14 |
| 2022/0176490 | A1* | 6/2022 | Pan | B23K 26/123 |
| 2022/0347797 | A1* | 11/2022 | Cretteur | C22C 38/18 |
| 2024/0351140 | A1* | 10/2024 | Pan | B23K 26/348 |

FOREIGN PATENT DOCUMENTS

| | | | | | |
|---|---|---|---|---|---|
| CN | 106334875 | A | * | 1/2017 | C22C 38/02 |
| CN | 106687248 | A | | 5/2017 | |
| CN | 106794671 | A | | 5/2017 | |
| CN | 108213711 | A | | 6/2018 | |
| CN | 108838541 | | | 11/2018 | |
| JP | H07171694 | A | | 7/1995 | |
| JP | 2006021224 | A | * | 1/2006 | B23K 26/1429 |

OTHER PUBLICATIONS

Machine English translation of CN-106334875-A (Year: 2017).*
The extended EP Search Report for EP No. 20785301.1-1103/3815837PCT/CN2020081743 dated Jul. 7, 2022.
OA from India Patent Office for IN App. No. 202117038282 dated Apr. 18, 2023.
International Search Report for PCT/CN2020/081743, mailed Jul. 1, 2020.
Written Opinion for PCT/CN2020/081743, mailed Jul. 1, 2020.
B182K59 Third Party Observations, Oct. 8, 2021.
Hearing Notice in Reference of Indian App No. 202117038282 dated Jun. 19, 2024.

* cited by examiner

DIFFERENT-STRENGTH STEEL WELDING COMPONENT WITH ALUMINUM OR ALUMINUM-ALLOY PLATING AND METHOD FOR MANUFACTURING SAME

CROSS-REFERENCE TO RELATED APPLICATIONS

This application is a 371 U.S. National Phase of PCT International Application No. PCT/CN2020/081743 filed on Mar. 27, 2020, which claims benefit and priority to Chinese patent application nos. CN 201910249188.6 filed on Mar. 29, 2019, the content of both are incorporated by reference herein in their entireties.

TECHNICAL FIELD

The present disclosure relates to manufacture of a welded component, in particular to a differential-strength steel welded component with an aluminum or aluminum alloy clad layer and a method for manufacturing the same.

BACKGROUND ART

In today's society, automobiles are more and more popularized. As the vehicle population rises steadily, there is growing concern about the conflict between vehicle exhaust emission and environmental protection. Reduction of vehicle weight may help reduce oil consumption and exhaust emission. Hence, high strength and thinning become a trend for development of automotive materials. Hot stamping is a conventional process for imparting high strength to parts and components by way of combining heat treatment and high-temperature forming to provide a product with high strength. Laser tailor-welded blank hot stamping can reduce the number of parts in a vehicle body and increase manufacture precision while reducing weight.

Common laser tailor-welded hot stamped products mainly include safety structural members such as A pillars, B pillars, center tunnels, etc. These hot stamped products are characterized by high strength, complex shape, good formability, high dimensional precision, small rebound resilience, differential strength, differential thickness, etc. A differential-strength tailor-welded member for a B pillar represents a trend for development of an automotive material, generally formed by tailor welding one steel plate having a tensile strength of 1300 MPa-1700 MPa after hot stamping to another steel plate having a tensile strength of 400 MPa-700 MPa after hot stamping. Steel plates for hot stamping include bare steel plates without clad layers and steel plates with clad layers when classified according to surface state. Because hot stamped steel plates with clad layers exhibit better resistance to corrosion and high-temperature oxidation than bare steel plates, and need no shot blasting or pickling after the hot stamping, they have attracted more and more attention. The thermally formed steel in the most common use is hot-stamped steel with an aluminum or aluminum alloy clad layer. However, in the process of welding this kind of material, the clad layer melts into a molten pool under the influence of welding heat, forming brittle and rigid intermetallic compounds with iron ($Fe_3Al$, $Fe_2Al_5$, $FeAl_3$). In post-welding heat treatment, these intermetallic compounds will further grow, resulting in notable decrease in the strength and ductility of the welded joint, such that the requirements for use in automobile plants cannot be satisfied.

Chinese Patent Publication No. CN101426612A discloses a process for manufacturing a welding blank from a steel plate with an aluminum-silicon clad layer, wherein the welding blank only comprises a pre-coating of an intermetallic compound. In particular, the aluminum alloy layer in the clad layer is removed in order to avoid melting of excessive aluminum in a molten pool, while the intermetallic compound layer remains in the clad layer. Thereafter, the welding blank is subjected to welding and hot stamping. Despite the removal of the alloy layer from the clad layer in this patent application, the remaining intermetallic compound layer (having a thickness of 3-10 μm) still enables introduction of the elements in the clad layer into a welding line. If controlled improperly, the properties of the welding line will be degraded easily. In addition, the remaining of the several micrometers of clad layer renders steady operation very difficult, increasing risk in production.

SUMMARY OF THE INVENTION

One object of the present disclosure is to provide a differential-strength steel welded component with an aluminum or aluminum alloy clad layer and a method for manufacturing the same, thereby solving a problem accompanying welding of a high-strength steel plate and a low-strength steel plate: the elements in the clad layer immigrate to a welding line, such that tensile strength of the welding line after hot stamping is less than the strength of the base material of the low-strength steel, and thus the welding line tends to fracture when the component is loaded. When the welded component obtained according to the present disclosure is used, its welding line has a tensile strength that is higher than the tensile strength of the base material of the low-strength steel, and an elongation rate of greater than 4%, thereby meeting the requirements for use of this differential-strength tailor-welded component in the hot stamping field for automobiles.

To achieve the above object, the technical solution of the present disclosure is as follows:

A method for manufacturing a differential-strength steel welded component with an aluminum or aluminum alloy clad layer, comprising the following steps:

1) Preparation before steel plate welding

Taking two straight steel plates for use as the steel plates to be welded, wherein the steel plate to be welded comprises a substrate and at least one clad layer on a surface thereof, wherein the clad layer comprises an intermetallic compound alloy layer in contact with the substrate and a metal alloy layer thereon, wherein the clad layer in a to-be-welded zone of the steel plate to be welded is not removed or thinned; wherein the two steel plates to be welded are a high-strength steel plate and a low-strength steel plate respectively, wherein the high-strength steel plate has a tensile strength of from 1300 MPa to 1700 MPa after hot stamping, and the low-strength steel plate has a tensile strength of from 400 MPa to 700 MPa after hot stamping;

2) Presetting butt gap Presetting a butt gap between the two steel plates to be welded at 0.2-0.5 mm;

3) Welding

Integrating the two steel plates to be welded by welding using a laser filler wire welding process or a gas shielded welding process, wherein the laser filler wire welding process uses a laser spot having a diameter of from 1.2 mm to 2.0 mm, preferably from 1.4 mm to 2.0 mm; a defocus distance of from −3 mm to 0 mm, preferably from −3 mm to −1 mm; a laser power controlled at from 4 kW to 6 kW; a welding speed controlled at from 40 mm/s to 120 mm/s, preferably from 60 mm/s to 120 mm/s; a welding wire having a diameter of from 0.8 mm to 1.4 mm, preferably from 0.8 mm to 1.2 mm; and a wire feeding speed of from 50 mm/s to 100 mm/s; wherein 99.99% high-purity argon with a flow rate of 10-25 L/min is used as a shielding gas; wherein a gas feeding pipe is 60-120 degrees relative to a welding direction and delivers the shielding gas uniformly and stably to a welding area.

Preferably, the substrate of the high-strength steel plate has a composition based on weight percentage of C: 0.08-0.8%, Si: 0.05-1.0%, Mn: 0.1-5%, P<0.3%, S<0.1%, Al<0.3%, preferably 0.01-0.2%, more preferably 0.04-0.12%, Ti<0.5%, preferably 0.01-0.4%, B: 0.0005-0.1%, Cr: 0.01-3%, and a balance of Fe and unavoidable impurities.

Preferably, the substrate of the low-strength steel plate has a composition based on weight percentage of C: 0.03-0.1%, preferably 0.05-0.1%, Si: 0-0.3%, preferably 0.01-0.3%, more preferably 0.05-0.2%, Mn: 0.5-2.0%, preferably 0.5-1.5%, P<0.1%, S<0.05%, Al<0.1%, preferably 0.02-0.08%, Cr: 0-0.1%, preferably 0.01-0.1%, more preferably 0.02-0.1%, Ti: 0-0.05%, preferably 0.001-0.045%, and a balance of Fe and unavoidable impurities. Preferably, the substrate of the low-strength steel plate has a composition based on weight percentage of C: 0.06-0.1%, Si: 0.06-0.2%, Mn: 0.5-1.5%, P<0.1%, preferably P<0.03%, S<0.05%, preferably S<0.005%, Al: 0.02-0.08%, Cr: 0.02-0.1%, Ti: 0.002-0.045%, and a balance of Fe and unavoidable impurities.

Preferably, the substrate of the high-strength steel plate has a composition based on weight percentage of C: 0.1-0.6%, Si: 0.07-0.7%, Mn: 0.3-4%, P<0.2%, S<0.08%, Al<0.2%, preferably 0.04-0.1%, Ti≤0.4%, preferably 0.01-0.3%, B: 0.0005-0.08%, Cr: 0.01-2%, preferably 0.1-1.0%, and a balance of Fe and unavoidable impurities.

Preferably, the substrate of the high-strength steel plate has a composition based on weight percentage of C: 0.15-0.5%, Si: 0.1-0.5%, Mn: 0.5-3%, P<0.1%, S<0.05%, Al<0.1%, preferably 0.04-0.09%, Ti≤0.2%, preferably 0.02-0.2%, B: 0.0005-0.08%, Cr: 0.01-1%, and a balance of Fe and unavoidable impurities. More preferably, B: 0.003-0.08%, Cr: 0.1-0.8%.

Preferably, the substrates of the high-strength steel plate and the low-strength steel plate have a thickness of from 0.5 mm to 3 mm.

Preferably, the clad layer is pure aluminum or aluminum alloy, wherein the aluminum alloy has a composition based on weight percentage of Si: 5-11%, Fe: 0-4%, and a balance of Al.

Preferably, the welding is performed with the use of a welding wire having a composition based on weight percentage of C 0.1-0.25%, Si 0.2-0.4%, Mn 1.2-2%, P≤0.03%, S<0.006%, Al<0.06%, Ti 0.02-0.08%, Cr 0.05-0.2%, and a balance of Fe and unavoidable impurities; wherein the welding wire has a diameter of 0.8-1.4 mm Preferably, 0.03%≤Al<0.06%.

Preferably, the welding is performed with the use of a welding wire having a composition based on weight percentage of C 0.1-0.15%, Si 0.2-0.4%, Mn 1.5-2%, P≤0.03%, S<0.006%, Al<0.06%, Ti 0.02-0.08%, Cr 0.05-0.2%, and a balance of Fe and unavoidable impurities; wherein the welding wire has a diameter of 0.8-1.4 mm Preferably, 0.03%≤Al<0.04%.

Preferably, the method further comprises a hot stamping step after the welding. Preferably, the hot stamping step comprises: subjecting a blank obtained after the welding to heat insulation at 900-960° C., preferably 930-950° C., for 1-6 minutes, preferably heat treatment for 2-4 minutes, followed by cooling, preferably water cooling for 5-20 seconds.

Preferably, the gas shielded welding is gas metal arc welding. Preferably, the gas metal arc welding uses a welding current of 80-130 A, a welding voltage of 17-25 V, a welding speed of 300-800 mm/min, a welding wire having a diameter of 0.8-1.4 mm, wherein 60-90% argon+10-40% carbon dioxide with a flow rate of 10-25 L/min is used as a shielding gas; wherein a gas feeding direction is 60-120 degrees relative to a welding direction.

The differential-strength steel welded component with an aluminum or aluminum alloy clad layer according to the present disclosure is formed by butt welding of a high-strength steel plate and a low-strength steel plate, wherein the high-strength steel plate has a tensile strength of 1300-1700 MPa after hot stamping; and the low-strength steel plate has a tensile strength of 400-700 MPa after hot stamping, wherein the high-strength steel plate and the low-strength steel plate each comprise a substrate and at least one pure aluminum or aluminum alloy clad layer on a surface thereof, and the clad layer comprises an intermetallic compound alloy layer in contact with the substrate and a metal alloy layer thereon.

Preferably, the substrate of the high-strength steel plate has a composition based on weight percentage of C: 0.08-0.8%, Si: 0.05-1.0%, Mn: 0.1-5%, P<0.3%, S<0.1%, Al<0.3%, Ti<0.5%, B: 0.0005-0.1%, Cr: 0.01-3%, and a balance of Fe and unavoidable impurities.

Preferably, the substrate of the low-strength steel plate has a composition based on weight percentage of C: 0.03-0.1%, preferably 0.05-0.1%, Si: 0-0.3%, preferably 0.01-0.3%, more preferably 0.05-0.2%, Mn: 0.5-2.0%, preferably 0.5-1.5%, P<0.1%, S<0.05%, Al<0.1%, preferably 0.02-0.08%, Cr: 0-0.1%, preferably 0.01-0.1%, more preferably 0.02-0.1%, Ti: 0-0.05%, preferably 0.001-0.045%, and a balance of Fe and unavoidable impurities.

Preferably, the substrate of the high-strength steel plate has a composition based on weight percentage of C: 0.1-0.6%, Si: 0.07-0.7%, Mn: 0.3-4%, P<0.2%, S<0.08%, Al<0.2%, Ti<0.4%, B: 0.0005-0.08%, Cr: 0.01-2%, and a balance of Fe and other unavoidable impurities.

Preferably, the substrate of the high-strength steel plate has a composition based on weight percentage of C: 0.15-0.5%, Si: 0.1-0.5%, Mn: 0.5-3%, P<0.1%, S<0.05%, Al<0.1%, Ti<0.2%, B: 0.0005-0.08%, Cr: 0.01-1%, and a balance of Fe and other unavoidable impurities. More preferably, B: 0.003-0.08%, Cr: 0.1-0.8%.

Preferably, the substrates of the high-strength steel plate and the low-strength steel plate have a thickness of from 0.5 mm to 3 mm.

Preferably, the clad layer is pure aluminum or aluminum alloy, wherein the aluminum alloy has a composition based on weight percentage of Si: 5-11%, Fe: 0-4%, and a balance of Al.

Preferably, the welding line of the differential-strength steel welded component has a tensile strength that is greater than the strength of the low-strength steel base material. If the welding joint is fractured under a tensile load, the fracture occurs in the low-strength steel base material. The welding joint has an elongation of greater than 4%.

Preferably, the differential-strength steel welded component is an A-pillar, a B-pillar or a center tunnel of an automobile.

In some embodiments, the method for manufacturing a differential-strength steel welded component with an aluminum or aluminum alloy clad layer according to the present disclosure comprises the following steps:

1) Preparation before steel plate welding

Using a cold-rolled steel plate or a steel plate with an aluminum or aluminum alloy clad layer having the above-mentioned composition as a welding blank, wherein it's ensured that the steel plate is flat, clean and free of oil and water stains;

2) Presetting butt gap for welding

Keeping a butt gap between two steel plates to be edge welded at 0.2-0.5 mm;

3) Laser welding process

Using a laser filler wire welding process or a gas shielded welding process for the welding, wherein the laser filler wire welding process uses a laser spot having a diameter of from 1.2 mm to 2.0 mm, preferably from 1.4 mm to 2.0 mm; a defocus distance of from −3 mm to 0 mm, preferably from −3 mm to −1 mm; a laser power controlled at from 4 kW to 6 kW; a welding speed controlled at from 40 mm/s to 120 mm/s, preferably from 60 mm/s to 120 mm/s; a welding wire having a diameter of from 0.8 mm to 1.2 mm; and a wire feeding speed of from 50 mm/s to 100 mm/s; wherein 99.99% high-purity argon with a flow rate of 10-25 L/min is used as a shielding gas; wherein a gas feeding pipe is 60-120 degrees relative to a welding direction and delivers the shielding gas uniformly and stably to a welding area; wherein the gas shielded welding is gas metal arc welding, wherein the gas metal arc welding preferably uses a welding current of 80-130 A, a welding voltage of 17-25V, a welding speed of 300-800 mm/min, a welding wire having a diameter of 0.8-1.4 mm, wherein 60-90% argon+10-40% carbon dioxide with a flow rate of 10-25 L/min is used as a shielding gas; wherein a gas feeding direction is 60-120 degrees relative to a welding direction.

In addition, a welding wire used in the method for manufacturing a differential-strength steel welded component with an aluminum or aluminum alloy clad layer according to the present disclosure has a composition based on weight percentage of C 0.1-0.25%, Si 0.2-0.4%, Mn 1.2-2%, P≤0.03%, S<0.006%, Al<0.06%, Ti 0.02-0.08%, Cr 0.05-0.2%, and a balance of Fe and unavoidable impurities; wherein the welding wire has a diameter of 0.8-1.4 mm Preferably, 0.03%≤Al<0.06%. Preferably, the welding wire having a composition based on weight percentage of C 0.1-0.15%, Si 0.2-0.4%, Mn 1.5-2%, P≤0.03%, S<0.006%, Al<0.06%, preferably 0.03≤Al<0.04%, Ti 0.02-0.08%, Cr 0.05-0.2%, and a balance of Fe and unavoidable impurities; wherein the welding wire has a diameter of 0.8-1.4 mm.

In the compositional design of the welding wire according to the present disclosure:

Silicon is a deoxygenating element in the welding wire. It can prevent iron from combining with oxygen, and reduce iron oxide in a molten pool. However, if silicon is used alone for deoxygenation, due to the high melting point (about 1710° C.) and small particle size of the resulting silicon dioxide, it's difficult for silicon dioxide particles to float and be removed from the molten pool, which leads to easy entrapment of slag in the welding line. Therefore, the weight percentage of silicon in the welding wire is controlled within the range of 0.2-0.4%.

Manganese is an important hardenability element, having a great influence on the toughness of the welding line. It is also a deoxygenating element, but its deoxygenating ability is slightly lower than that of silicon. If manganese is used alone for deoxygenation, it's difficult for the resulting manganese oxide to float and be removed from the molten pool due to its high density. Therefore, silicon and manganese are used in combination in the welding wire for deoxygenation according to the present disclosure, so that the deoxygenation product is a composite silicate salt ($MnO{\cdot}SiO_2$) which has a lower melting point (about 1270° C.) and a lower density and can aggregate into large molten slag in the molten pool. Hence, its floating is favored, and good deoxygenating effect can be achieved. In addition, manganese also has a function of desulfurization. It combines with sulfur to produce manganese sulfide, which can reduce the propensity of sulfur to cause thermal cracking. With various factors taken into consideration, the weight percentage of manganese in the welding wire according to the present disclosure is controlled between 1.2-2%.

Sulfur tends to form iron sulfide in the molten pool, and iron sulfide is distributed in the grain boundary like a network. Thus, the toughness of the welding line is reduced notably. Therefore, sulfur in the welding wire is harmful, and its content must be strictly controlled. Preferably, the S content is controlled to be less than 0.006%.

The strengthening effect of phosphorus in steel is second only to carbon. Phosphorus increases the strength and hardness of the steel. Phosphorus can also improve the corrosion resistance of the steel, but the plasticity and toughness are reduced remarkably, especially at low temperatures. Hence, phosphorus is harmful in the welding wire, and its content must be strictly controlled. Preferably, the P content is controlled to be less than or equal to 0.03%.

Chromium can increase the strength and hardness of steel without decreasing the plasticity and toughness obviously. Chromium can increase the hardenability of the steel and has a secondary hardening effect, which can increase the hardness and wear resistance of carbon steel without embrittling the steel. Chromium can expand the γ phase region, improve the hardenability and thermal strength, reduce the temperature window in which the δ phase exists at high temperatures, promote the δ→γ phase transition, and inhibit precipitation of high temperature δ ferrite. Therefore, the weight percentage of chromium in the welding wire is controlled within 0.05-0.2%.

Titanium is also a strong deoxygenating element, and can form titanium nitride with nitrogen. Hence, it has a good nitrogen fixation effect and thus improves the ability of the welding line metal to resist formation of nitrogen pores. When there is an appropriate amount of titanium in the welding line structure, the welding line structure can be refined. Therefore, the weight percentage of titanium in the welding wire is controlled within 0.02-0.08%.

When welding a plated plate having a preset welding gap, a welding wire comprising Mn, Cr, Ti and other elements according to the present disclosure is delivered to the tailor welding area to suppress the formation of high temperature δ ferrite. Manganese and chromium elements can expand the γ phase region, improve the hardenability and thermal strength, reduce the temperature window in which the δ phase region exists at high temperatures, promote the δ→γ phase transition, and inhibit precipitation of high temperature δ ferrite, so as to guarantee a high martensite conversion in the welding line structure. Titanium refines the welding line structure, improves the welding line strength after hot stamping, and guarantees the mechanical properties of the welding joint.

The carbon equivalent formula recommended by the International Institute of Welding is as follows:

$$CE=C+Mn/6+(Cr+Mo+V)/5+(Ni+Cu)/15(\%)$$

The introduction of the welding wire will slightly increase the carbon equivalent of the welding joint, thereby ensuring the hardenability of the joint. In addition, the filling of the welding wire will further dilute the composition of the clad layer in the welding line, thereby helping to prevent formation of iron-aluminum intermetallic compounds and high-temperature ferrite phase in the welding line. At the end, it's ensured that the performances of the joint meet the requirements of the automotive industry.

When the component is welded using the method according to the present disclosure, the welding line of the component has a tensile strength that is greater than the strength of the low-strength steel base material after thermal forming. If the welded component is fractured under a tensile load, the fracture occurs in the low-strength steel base material.

According to the present disclosure, a welding wiring comprises Mn, Cr, Ti and other elements is used in combination with a high energy laser welding method. By optimizing the welding process, a welded component is obtained, wherein, after hot stamping, the welding line of the welded component has a tensile strength that is higher than the tensile strength of the base material of the low-strength steel, and an elongation rate of greater than 4%, thereby meeting the requirements for use of this differential-strength welded component in the hot stamping field for automobiles.

In the method for manufacturing differential-strength steel welded component with an aluminum or aluminum alloy clad layer:

1. The steel plate to be welded according to the present disclosure is provided with a clad layer on at least one surface of the substrate, wherein the clad layer comprises an intermetallic compound alloy layer in contact with the substrate and a metal alloy layer thereon. In particular, according to the present disclosure, the clad layer in the to-be-welded zone of the component to be welded is not removed or thinned before the welding or during the welding.
2. Before the welding, it's ensured that the surface of the steel plate to be welded is clean. The thickness of the substrate is 0.5 mm-3 mm, and a gap of 0.2 mm-0.5 mm is preset for the splicing portion. A welding device is used to tailor weld the steel plate with the clad layer. The clad layer enters the molten pool under the welding heat, and is vigorously agitated during the welding to facilitate homogenization of the composition.

In addition, by controlling the wire feeding speed at 40-120 mm/s, the composition of the deposited metal (the welding line metal formed after the welding wire is melted) in the welding line is changed, so that the concentration of aluminum element in the welding line is less than 10%. At the same time, manganese, chromium and other elements in the welding wire increase the stability of austenite and improve the hardenability of the welding line, thereby avoiding formation of iron-aluminum intermetallic compounds and granular ferrite phase in the welding line during hot stamping, thus realizing control over the structure and size of the welding line phase.

3. The heat treatment of the differential-strength steel welded component according to the present disclosure provides a microstructure that is a martensite structure. However, due to the presence of the aluminum-containing clad layer, the aluminum clad layer will melt and enter the welding line during the welding, which affects the phase transition and structural composition of the welding line. The quality of the welding joint depends on the proportion of the martensite structure in the welding line structure and the morphology of ferrite. For this reason, it is necessary to reduce precipitation of ferrite in the welding line structure, especially to avoid the formation of granular ferrite.

The formation of high temperature δ ferrite is suppressed by using a welding wire comprising Mn, Cr, Ti and other elements according to the present disclosure. Mn and Cr are elements that expand the γ phase region and improve hardenability and thermal strength. They reduce the temperature window in which the δ phase region exists at high temperatures, promote the δ→γ phase transition, inhibit the precipitation of high-temperature δ ferrite, increase the stability of austenite, and promote the hardenability of the welding line. Titanium refines the welding line structure. After hot stamping, the strength of the welding line is improved, thereby ensuring the mechanical performances of the welding joint.

4. The present disclosure eliminates the need to remove or thin the clad layer of a component to be welded before welding and/or during the welding as required in the prior art. Hence, there is no need to arrange a clad layer pretreatment line, thereby saving equipment investment.

In addition, no matter what method is used to remove or thin the clad layer in the prior art, the production speed will be slowed. With the use of the clad layer pretreatment process according to the present disclosure, the production efficiency can be increased by at least 20%.

The direct welding according to the filler wire welding method of the present disclosure, without removing or thinning the clad layer of the component to be welded, guarantees the tensile strength, elongation and corrosion resistance of the welding joint after hot stamping. After the hot stamping, the tensile strength of the welding line is greater than that of the low-strength steel base material, such that if the welding joint is fractured under a tensile load, the fracture occurs in the low-strength steel base material. The welding joint has an elongation of greater than 4%.

DETAILED DESCRIPTION OF THE INVENTION

The disclosure will be further illustrated with reference to the following Examples and accompanying drawings.

Example 1

Figure 1:
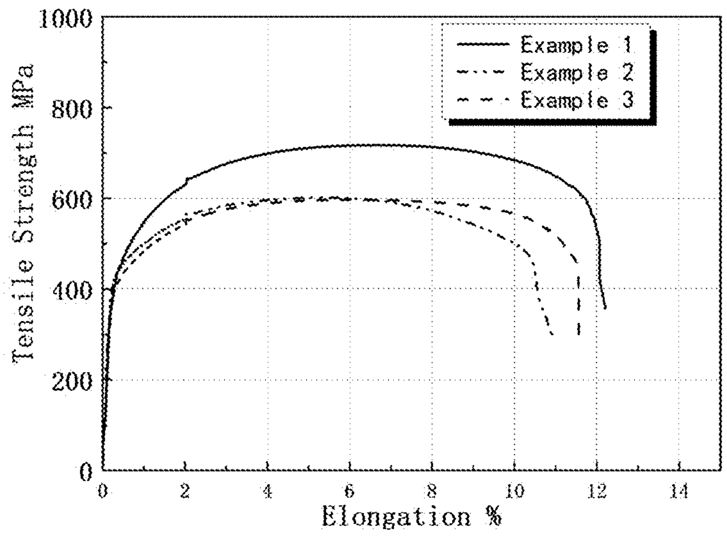
FIG. 1 shows tensile curves of the welding joints in the Examples according to the present disclosure.
Figure 2:
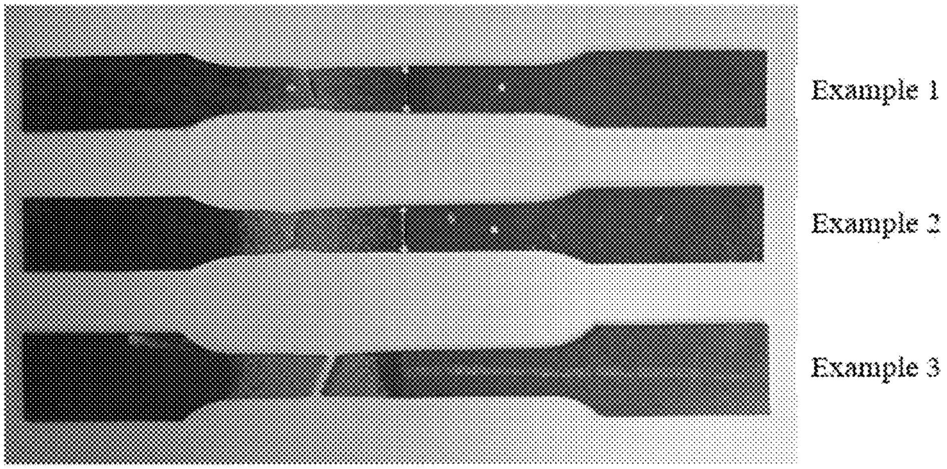
FIG. 2 shows the samples in which the welding joints fractured under tension in the Examples according to the present disclosure.
Figure 3:
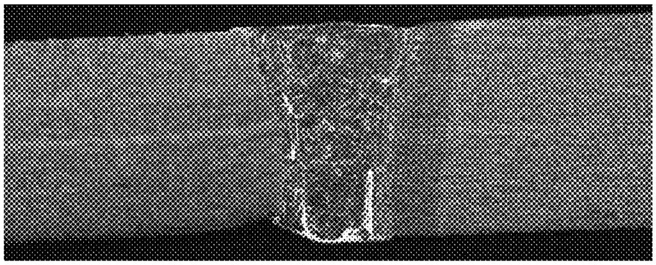
FIG. 3 is a metallographic diagram of a welding joint in Example 1 according to the present disclosure.
Figure 6:
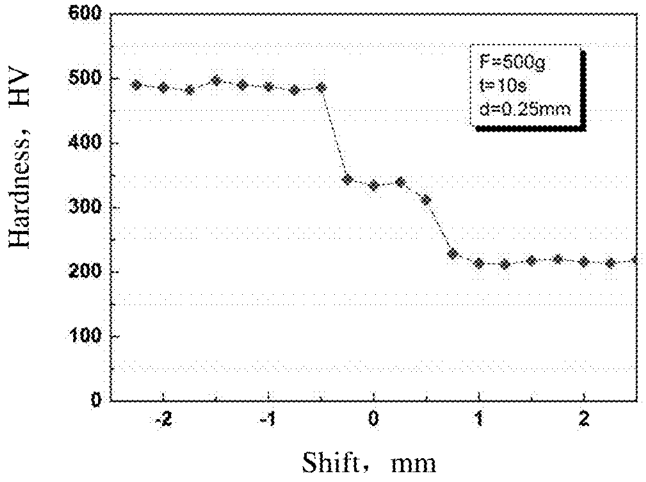
FIG. 6 shows the hardness distribution of the welding joint in Example 1 according to the present disclosure.

A high-strength hot formed steel plate with an aluminum-silicon clad layer (t=1.75 mm) and a low-strength hot formed steel plate with an aluminum-silicon clad layer (t=1.8 mm) were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The welding wire developed by the invention was used. A laser power of 4.5 kW, a spot diameter of 2 mm, a defocus distance of −2 mm, a welding speed of 80 mm/s, a welding wire diameter of 1.2 mm, and a wire feeding speed of 70 mm/s were employed. The composition of the welding wire is shown in Table 3. High-purity argon was used as a shielding gas. The gas flow rate was 15 L/min. The gas feeding direction was at an angle of 120 degrees relative to the welding direction. After tailor welded using the welding process described above, the blanks were heated at 930° C. for 4 minutes and cooled in a water-passing mold for 10 seconds. The mechanical properties of the welding joint are shown in Table 4; the tensile curve of the welding joint is shown in FIG. 1; the fractured position is shown in FIG. 2; the metallographic phase of the joint is shown in FIG. 3; and the hardness of the joint is shown in FIG. 6.

Example 2

Figure 4:
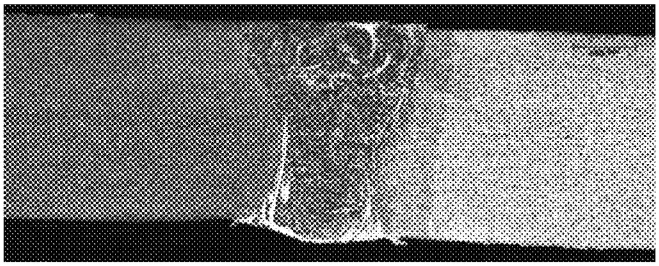
FIG. 4 is a metallographic diagram of a welding joint in Example 2 according to the present disclosure.

A high-strength hot formed steel plate with an aluminum-silicon clad layer (t=1.8 mm) and a low-strength hot formed steel plate with an aluminum-silicon clad layer (t=1.8 mm) were used for welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.4 mm. The welding wire developed by the invention was used. A laser power of 4.5 kW, a spot diameter of 2 mm, a defocus distance of −3 m, a welding speed of 80 mm/s, a welding wire diameter of 1.2 mm, and a wire feeding speed of 80 mm/s were employed. The composition of the welding wire is shown in Table 3. High-purity argon was used as a shielding gas. The gas flow rate was 15 L/min. The gas feeding direction was at an angle of 60 degrees relative to the welding direction. After tailor welded using the welding process described above, the blanks were heated at 930° C. for 4 minutes and cooled in a water-passing mold for 10 seconds. The mechanical properties of the welding joint are shown in Table 4; the tensile curve of the welding joint is shown in FIG. 1; the fractured position is shown in FIG. 2; and the metallographic phase of the joint is shown in FIG. 4.

Example 3

Figure 5:
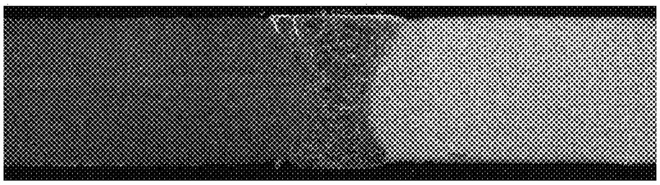
FIG. 5 is a metallographic diagram of a welding joint in Example 3 according to the present disclosure.

A high-strength hot formed steel plate with an aluminum-silicon clad layer (t=1.5 mm) and a low-strength hot formed steel plate with an aluminum-silicon clad layer (t=1.5 mm) were used for welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.25 mm. The welding wire developed by the invention was used. A laser power of 4 kW, a spot diameter of 2 mm, a defocus distance of −1 mm, a welding speed of 60 mm/s, a welding wire diameter of 1.2 mm, and a wire feeding speed of 60 mm/s were employed. The composition of the welding wire is shown in Table 3. High-purity argon was used as a shielding gas. The gas flow rate was 15 L/min. The gas feeding direction was at an angle of 120 degrees relative to the welding direction. After tailor welded using the welding process described above, the blanks were heated at 930° C. for 4 minutes and cooled in a water-passing mold for 10 seconds. The mechanical properties of the welding joint are shown in Table 4; the tensile curve of the welding joint is shown in FIG. 1; the fractured position is shown in FIG. 2; and the metallographic phase of the joint is shown in FIG. 5.

Example 4

A high-strength hot formed steel plate with no clad layer (t=1.4 mm) and a low-strength hot formed steel plate with an aluminum-silicon clad layer (t=1.8 mm) were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The welding wire developed by the invention was used. A laser power of 4.5 kW, a spot diameter of 2 mm, a defocus distance of −2 mm, a welding speed of 80 mm/s, a welding wire diameter of 1.2 mm, and a wire feeding speed of 70 mm/s were employed. The composition of the welding wire is shown in Table 3. High-purity argon was used as a shielding gas. The gas flow rate was 15 L/min. The gas feeding direction was at an angle of 90 degrees relative to the welding direction. After tailor welded using the welding process described above, the blanks were heated at 950° C. for 3 minutes and cooled in a water-passing mold for 10 seconds. The mechanical properties of the welding joint are shown in Table 4.

Example 5

A high-strength hot formed steel plate with an aluminum-silicon clad layer (t=1.2 mm) and a low-strength hot formed steel plate with no clad layer (t=1.4 mm) were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The welding wire developed by the invention was used. A laser power of 4.5 kW, a spot diameter of 1.4 mm, a defocus distance of −1 mm, a welding speed of 75 mm/s, a welding wire diameter of 1.0 mm, and a wire feeding speed of 100 mm/s were employed. The composition of the welding wire is shown in Table 3. High-purity argon was used as a shielding gas. The gas flow rate was 15 L/min. The gas feeding direction was at an angle of 90 degrees relative to the welding direction. After tailor welded using the welding process described above, the blanks were heated at 950° C. for 3 minutes and cooled in a water-passing mold for 10 seconds. The mechanical properties of the welding joint are shown in Table 4.

Example 6

A high-strength hot formed steel plate with an aluminum-silicon clad layer (t=1.75 mm) and a low-strength hot formed steel plate with an aluminum-silicon clad layer (t=1.4 mm) were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The welding wire developed by the invention was used. A laser power of 5.5 kW, a spot diameter of 1.4 mm, a defocus distance of −2 mm, a welding speed of 120 mm/s, a welding wire diameter of 1.2 mm, and a wire feeding speed of 70 mm/s were employed. The composition of the welding wire is shown in Table 3. High-purity argon was used as a shielding gas. The gas flow rate was 15 L/min. The gas feeding direction was at an angle of 90 degrees relative to the welding direction. After tailor welded using the welding process described above, the blanks were heated at 950° C. for 3 minutes and cooled in a water-passing mold for 10 seconds. The mechanical properties of the welding joint are shown in Table 4.

Example 7

A high-strength hot formed steel plate with no clad layer (t=1.8 mm) and a low-strength hot formed steel plate with an aluminum-silicon clad layer (t=1.4 mm) were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The welding wire developed by the invention was used. A laser power of 4.5 kW, a spot diameter of 2 mm, a defocus distance of −2 mm, a welding speed of 100 mm/s, a welding wire diameter of 1.2 mm, and a wire feeding speed of 50 mm/s were employed. The composition of the welding wire is shown in Table 3. High-purity argon was used as a shielding gas. The gas flow rate was 15 L/min. The gas feeding direction was at an angle of 90 degrees relative to the welding direction. After tailor welded using the welding process described above, the blanks were heated at 950° C. for 3 minutes and cooled in a water-passing mold for 10 seconds. The mechanical properties of the welding joint are shown in Table 4.

Example 8

A high-strength hot formed steel plate with an aluminum-silicon clad layer (t=1.5 mm) and a low-strength hot formed steel plate with an aluminum-silicon clad layer (t=1.4 mm) were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The welding wire developed by the invention was used. A laser power of 4.5 kW, a spot diameter of 2.0 mm, a defocus distance of −1 mm, a welding speed of 80 mm/s, a welding wire diameter of 1.2 mm, and a wire feeding speed of 80 mm/s were employed. The composition of the welding wire is shown in Table 3. High-purity argon was used as a shielding gas. The gas flow rate was 15 L/min. The gas feeding direction was at an angle of 90 degrees relative to the welding direction. After tailor welded using the welding process described above, the blanks were heated at 950° C. for 3 minutes and cooled in a water-passing mold for 10 seconds. The mechanical properties of the welding joint are shown in Table 4.

Example 9

A high-strength hot formed steel plate with no clad layer (t=1.4 mm) and a low-strength hot formed steel plate with an aluminum-silicon clad layer (t=1.2 mm) were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The welding wire developed by the invention was used. A laser power of 5 kW, a spot diameter of 2 mm, a defocus distance of −1 mm, a welding speed of 120 mm/s, a welding wire diameter of 1.2 mm, and a wire feeding speed of 50 mm/s were employed. The composition of the welding wire is shown in Table 3. High-purity argon was used as a shielding gas. The gas flow rate was 15 L/min. The gas feeding direction was at an angle of 90 degrees relative to the welding direction. After tailor welded using the welding process described above, the blanks were heated at 950° C. for 2.5 minutes and cooled in a water-passing mold for 10 seconds. The mechanical properties of the welding joint are shown in Table 4.

Example 10

A high-strength hot formed steel plate with an aluminum-silicon clad layer (t=1.2 mm) and a low-strength hot formed steel plate with an aluminum-silicon clad layer (t=1.8 mm) were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The welding wire developed by the invention was used. A laser power of 4.5 kW, a spot diameter of 1.4 mm, a defocus distance of −1 mm, a welding speed of 80 mm/s, a welding wire diameter of 1.0 mm, and a wire feeding speed of 100 mm/s were employed. The composition of the welding wire is shown in Table 3. High-purity argon was used as a shielding gas. The gas flow rate was 15 L/min. The gas feeding direction was at an angle of 90 degrees relative to the welding direction. After tailor welded using the welding process described above, the blanks were heated at 950° C. for 4 minutes and cooled in a water-passing mold for 10 seconds. The mechanical properties of the welding joint are shown in Table 4.

Example 11

A high-strength hot formed steel plate with an aluminum-silicon clad layer (t=1.2 mm) and a low-strength hot formed steel plate with an aluminum-silicon clad layer (t=1.8 mm), which were the same as those used in Example 10, were used for tailor welding. The chemical compositions of the plates are shown in Tables 1 and 2. The steel plates were flat, and their surfaces were clean and free of oil and water stains. The to-be-welded edges of the high-strength and low-strength blanks were prepared by laser cutting. Before welding, the butt gap was preset at 0.3 mm. The same welding wire as that used in Example 10 was used. A welding current of 120 A, a welding voltage of 22 V, a welding speed of 500 mm/min, a preset gap of 0.5 mm between the plates to be tailor welded, and a welding wire diameter of 1.0 mm were employed. The shielding gas was 80% argon+20% carbon dioxide. The gas flow rate was 15 L/min. The gas feeding direction was at an angle of 90 degrees relative to the welding direction. After tailor welded using the welding process described above, the blanks were heated at 950° C. for 4 minutes and cooled in a water-passing mold for 10 seconds. The mechanical properties of the welding joint are shown in Table 4.

TABLE 1

| High-strength steel plate composition weight percentage (wt %) | | | | | | | | | |
|---|---|---|---|---|---|---|---|---|---|
| Ex. | C | Si | Mn | P | S | Al | Ti | B | Cr |
| 1 | 0.15 | 0.10 | 2.90 | 0.059 | 0.038 | 0.09 | 0.090 | 0.0031 | 0.15 |
| 2 | 0.25 | 0.23 | 1.19 | 0.015 | 0.001 | 0.04 | 0.030 | 0.0040 | 0.27 |
| 3 | 0.49 | 0.50 | 2.51 | 0.024 | 0.04 | 0.08 | 0.027 | 0.0052 | 0.51 |
| 4 | 0.39 | 0.36 | 3.00 | 0.044 | 0.03 | 0.07 | 0.05 | 0.0062 | 0.71 |
| 5 | 0.50 | 0.48 | 0.50 | 0.081 | 0.02 | 0.05 | 0.20 | 0.0071 | 0.20 |
| 6 | 0.15 | 0.10 | 2.90 | 0.059 | 0.038 | 0.09 | 0.090 | 0.0031 | 0.15 |
| 7 | 0.25 | 0.23 | 1.19 | 0.015 | 0.001 | 0.04 | 0.030 | 0.0040 | 0.27 |
| 8 | 0.49 | 0.50 | 2.51 | 0.024 | 0.04 | 0.08 | 0.027 | 0.0052 | 0.51 |
| 9 | 0.39 | 0.36 | 3.00 | 0.044 | 0.03 | 0.07 | 0.05 | 0.0062 | 0.71 |
| 10 | 0.50 | 0.48 | 0.50 | 0.081 | 0.02 | 0.05 | 0.20 | 0.0071 | 0.20 |

TABLE 2

| Low-strength steel plate composition weight percentage (wt %) | | | | | | | | |
|---|---|---|---|---|---|---|---|---|
| Ex. | C | Si | Mn | P | S | Al | Cr | Ti |
| 1 | 0.073 | 0.079 | 1.42 | 0.011 | 0.0018 | 0.031 | 0.076 | 0.002 |
| 2 | 0.06 | 0.199 | 0.76 | 0.015 | 0.004 | 0.046 | 0.028 | 0.004 |
| 3 | 0.065 | 0.185 | 0.81 | 0.024 | 0.005 | 0.071 | 0.051 | 0.007 |
| 4 | 0.095 | 0.065 | 0.5 | 0.01 | 0.001 | 0.053 | 0.095 | 0.045 |
| 5 | 0.073 | 0.079 | 1.42 | 0.011 | 0.0018 | 0.031 | 0.076 | 0.002 |
| 6 | 0.06 | 0.199 | 0.76 | 0.015 | 0.004 | 0.046 | 0.028 | 0.004 |
| 7 | 0.065 | 0.185 | 0.81 | 0.024 | 0.005 | 0.071 | 0.051 | 0.007 |
| 8 | 0.095 | 0.065 | 0.5 | 0.01 | 0.001 | 0.053 | 0.095 | 0.045 |
| 9 | 0.06 | 0.199 | 0.76 | 0.015 | 0.004 | 0.046 | 0.028 | 0.004 |
| 10 | 0.065 | 0.185 | 0.81 | 0.024 | 0.005 | 0.071 | 0.051 | 0.007 |

TABLE 3

| Welding wire composition weight percentage (wt %) | | | | | | | | |
|---|---|---|---|---|---|---|---|---|
| Ex. | C | Si | Mn | P | S | Al | Cr | Ti |
| 1 | 0.22 | 0.25 | 1.24 | 0.0087 | 0.002 | 0.0454 | 0.169 | 0.028 |
| 2 | 0.15 | 0.35 | 1.87 | 0.008 | 0.0018 | 0.0367 | 0.105 | 0.075 |
| 3 | 0.18 | 0.39 | 1.53 | 0.024 | 0.0010 | 0.057 | 0.082 | 0.051 |
| 4 | 0.12 | 0.29 | 1.67 | 0.03 | 0.0012 | 0.045 | 0.189 | 0.067 |
| 5 | 0.19 | 0.21 | 1.78 | 0.0062 | 0.005 | 0.030 | 0.052 | 0.058 |
| 6 | 0.22 | 0.25 | 1.24 | 0.0087 | 0.002 | 0.0454 | 0.169 | 0.028 |
| 7 | 0.15 | 0.35 | 1.87 | 0.008 | 0.0018 | 0.0367 | 0.105 | 0.075 |
| 8 | 0.18 | 0.39 | 1.53 | 0.024 | 0.0010 | 0.057 | 0.082 | 0.051 |
| 9 | 0.12 | 0.29 | 1.67 | 0.03 | 0.0012 | 0.045 | 0.189 | 0.067 |
| 10 | 0.19 | 0.21 | 1.78 | 0.0062 | 0.005 | 0.030 | 0.052 | 0.058 |

TABLE 4

| Mechanical properties of tailor welded plates after hot stamping | | | | | |
|---|---|---|---|---|---|
| Ex. | Tensile strength of high-strength steel base material (MPa) | Tensile strength of low-strength steel base material (MPa) | Joint elongation (%) | Fracture position | Joint corrosion resistance** |
| 1 | 1451 | 677 | 12.2 | Low-strength steel base material | Passed |
| 2 | 1531 | 570 | 10.7 | Low-strength steel base material | Passed |
| 3 | 1357 | 550 | 11.4 | Low-strength steel base material | Passed |
| 4 | 1589 | 643 | 11.5 | Low-strength steel base material | Passed |
| 5 | 1675 | 675 | 12.7 | Low-strength steel base material | Passed |
| 6 | 1470 | 563 | 9.6 | Low-strength steel base material | Passed |

TABLE 4-continued

| Mechanical properties of tailor welded plates after hot stamping | | | | | |
|---|---|---|---|---|---|
| Ex. | Tensile strength of high-strength steel base material (MPa) | Tensile strength of low-strength steel base material (MPa) | Joint elongation (%) | Fracture position | Joint corrosion resistance** |
| 7 | 1527 | 541 | 10.2 | Low-strength steel base material | Passed |
| 8 | 1384 | 633 | 11.8 | Low-strength steel base material | Passed |
| 9 | 1540 | 568 | 11.7 | Low-strength steel base material | Passed |
| 10 | 1648 | 545 | 12.3 | Low-strength steel base material | Passed |
| 11 | 1630 | 554 | 11.7 | Low-strength steel base material | Passed |

*Standard tensile samples having a nominal width of 12.5 mm and an original gauge length of 50 mm were used to measure the tensile strength and elongation;

**The corrosion resistance test was performed according to DIN50021, DIN50017, and DIN50014 standards.

We claim:

1. A method for manufacturing a differential-strength steel welded component with an aluminum or aluminum alloy clad layer, comprising the following steps:

1) Taking two steel plates, which are straight, for use as steel plates to be welded, wherein the two steel plates to be welded comprises a substrate and at least one of the two steel plates to be welded further comprises at least one clad layer on a surface of the substrate, wherein the at least one clad layer comprises an intermetallic compound alloy layer in contact with the substrate and a metal alloy layer on the intermetallic compound alloy layer, wherein the at least one clad layer in a to-be-welded zone of the steel plate to be welded is not removed or thinned; wherein the two steel plates to be welded are a high-strength steel plate and a low-strength steel plate respectively, wherein the high-strength steel plate has a tensile strength of from 1300 MPa to 1700 MPa after hot stamping, and the low-strength steel plate has a tensile strength of from 400 MPa to 700 MPa after hot stamping;

2) Presetting a butt gap between the two steel plates to be welded at 0.2-0.5 mm;

3) Integrating the two steel plates to be welded by welding using a laser filler wire welding process or a gas shielded welding process with a welding wire having a diameter of from 0.8 mm to 1.4 mm and consisting of a composition based on weight percentage of C 0.1-0.25%, Si 0.2-0.4%, Mn 1.2-2%, P<0.03%, S<0.006%, Al<0.06%, Ti 0.02-0.08%, Cr 0.05-0.2%, and a balance of Fe and unavoidable impurities, wherein the laser filler wire welding process uses a laser spot having a diameter of from 1.2 mm to 2.0 mm, a defocus distance of from −3 mm to 0 mm, a laser power controlled at from 4 KW to 6 KW, a welding speed controlled at from 40 mm/s to 120 mm/s, and a wire feeding speed of from 50 mm/s to 100 mm/s; wherein 99.99% high-purity argon with a flow rate of 10-25 L/min is used as a shielding gas; wherein a gas feeding pipe is 60-120 degrees relative to a welding direction and delivers the shielding gas uniformly and stably to a welding area;

the gas shielded welding process is a gas metal arc welding process; wherein, the gas metal arc welding process uses a welding current of 110-130 A, a welding voltage of 18-25 V, a welding speed of 300-800 mm/min, wherein 60-80% argon+20-40% carbon dioxide with a flow rate of 10-25 L/min is used as a shielding gas; wherein a gas feeding direction is 60-120 degrees relative to a welding direction.

2. The method for manufacturing a differential-strength steel welded component with an aluminum or aluminum alloy clad layer according to claim 1, wherein the substrate of the high-strength steel plate has a composition based on weight percentage of C: 0.08-0.8%, Si: 0.05-1.0%, Mn: 0.1-5%, P<0.3%, S<0.1%, Al<0.3%, Ti<0.5%, B: 0.0005-0.1%, Cr: 0.01-3%, and a balance of Fe and unavoidable impurities.

3. The method for manufacturing a differential-strength steel welded component with an aluminum or aluminum alloy clad layer according to claim 1, wherein the substrate of the high-strength steel plate has a composition based on weight percentage of C: 0.1-0.6%, Si: 0.07-0.7%, Mn: 0.3-4%, P<0.2%, S<0.08%, Al<0.2%, Ti<0.4%, B: 0.0005-0.08%, Cr: 0.01-2%, and a balance of Fe and unavoidable impurities.

4. The method for manufacturing a differential-strength steel welded component with an aluminum or aluminum alloy clad layer according to claim 1, wherein the substrate of the high-strength steel plate has a composition based on weight percentage of C: 0.15-0.5%, Si: 0.1-0.5%, Mn: 0.5-3%, P<0.1%, S<0.05%, Al<0.1%, Ti<0.2%, B: 0.0005-0.08%, Cr: 0.01-1%, and a balance of Fe and unavoidable impurities.

5. The method for manufacturing a differential-strength steel welded component with an aluminum or aluminum alloy clad layer according to claim 1, wherein the substrate of the low-strength steel plate has a composition based on weight percentage of C: 0.03-0.1%, Si: 0-0.3%, Mn: 0.5-2.0%, P<0.03%, S<0.01%, Al<0.1%, Cr: 0-0.1%, Ti: 0-0.05%, and a balance of Fe and unavoidable impurities.

6. The method for manufacturing a differential-strength steel welded component with an aluminum or aluminum alloy clad layer according to claim 1, wherein the clad layer is pure aluminum or aluminum alloy, wherein the aluminum alloy has a composition based on weight percentage of Si: 5-11%, Fe: 0-4%, and a balance of Al.

7. The method for manufacturing a differential-strength steel welded component with an aluminum or aluminum alloy clad layer according to claim 1, wherein the substrate of each of the high-strength steel plate and the low-strength steel plate has a thickness of 0.5-3 mm.

8. A differential-strength steel welded component with an aluminum or aluminum alloy clad layer manufactured by the method of claim 1.

9. The differential-strength steel welded component with an aluminum or aluminum alloy clad layer according to claim 8, wherein the differential-strength steel welded component is an A-pillar, a B-pillar or a center tunnel of an automobile.

10. A welding wire for use in the method for manufacturing a differential-strength steel welded component with an aluminum or aluminum alloy clad layer according to claim 1, wherein the welding wire consists of a composition based on weight percentage of C 0.1-0.25%, Si 0.2-0.4%, Mn 1.2-2%, P<0.03%, S<0.006%, Al<0.06%, Ti 0.02-0.08%, Cr 0.05-0.2%, and a balance of Fe and unavoidable impurities; wherein the welding wire has a diameter of 0.8-1.4 mm.

11. A differential-strength steel welded component with an aluminum or aluminum alloy clad layer, formed by butt welding of a high-strength steel plate and a low-strength steel plate, wherein the high-strength steel plate has a tensile strength of 1300-1700 MPa after hot stamping, and the low-strength steel plate has a tensile strength of 400-700 MPa after hot stamping; wherein the high-strength steel plate and the low-strength steel plate each comprise a substrate, and at least one of the high-strength steel plate and the low-strength steel plate comprises at least one pure aluminum or aluminum alloy clad layer on a surface of the substrate; wherein the at least one pure aluminum or aluminum alloy clad layer comprises an intermetallic compound alloy layer in contact with the substrate and a metal alloy layer on the intermetallic compound alloy layer; wherein the substrate of the high-strength steel plate has a composition based on weight percentage of C: 0.08-0.8%, Si: 0.05-1.0%, Mn: 0.1-5%, P<0.3%, S<0.1%, Al<0.3%, Ti<0.5%, B: 0.0005-0.1%, Cr: 0.01-3%, and a balance of Fe and unavoidable impurities; wherein the substrate of the low-strength steel plate consists of a composition based on weight percentage of C: 0.03-0.1%, Si: 0-0.3%, Mn: 0.5-2.0%, P<0.1%, S<0.05%, Al<0.1%, Cr: 0-0.1%, Ti: 0-0.05%, and a balance of Fe and unavoidable impurities; wherein a welding wire used to weld the high-strength steel plate and the low-strength steel plate consists of a composition based on weight percentage of C 0.1-0.25%, Si 0.2-0.4%, Mn 1.2-2%, P<0.03%, S<0.006%, Al<0.06%, Ti 0.02-0.08%, Cr 0.05-0.2%, and a balance of Fe and unavoidable impurities; wherein the welding wire has a diameter of 0.8-1.4 mm, and wherein a welding line structure of the differential-strength steel welded component is martensite+ferrite, and there is no iron-aluminum intermetallic compounds or granular ferrite phase in the welding line.

12. The differential-strength steel welded component with an aluminum or aluminum alloy clad layer according to claim 11, wherein the welding line structure of the differential-strength steel welded component has a tensile strength that is greater than the strength of the low-strength steel base material; when a welding joint is fractured under a tensile load, the fracture occurs in the low-strength steel base material; and the welding joint has an elongation of greater than 4%.

13. The differential-strength steel welded component with an aluminum or aluminum alloy clad layer according to claim 11, wherein the substrate of the high-strength steel plate has a composition based on weight percentage of C: 0.1-0.6%, Si: 0.07-0.7%, Mn: 0.3-4%, P<0.2%, S<0.08%, Al<0.2%, Ti<0.4%, B: 0.0005-0.08%, Cr: 0.01-2%, and a balance of Fe and unavoidable impurities.

14. The differential-strength steel welded component with an aluminum or aluminum alloy clad layer according to claim 13, wherein the substrate of the high-strength steel plate has a composition based on weight percentage of C: 0.1-0.6%, Si: 0.07-0.7%, Mn: 0.3-4%, P<0.2%, S<0.08%, Al: 0.04-0.1%, Ti: 0.01-0.3%, B: 0.0005-0.08%, Cr: 0.1-1.0%, and a balance of Fe and unavoidable impurities.

15. The differential-strength steel welded component with an aluminum or aluminum alloy clad layer according to claim 13, wherein the substrate of the high-strength steel plate has a composition based on weight percentage of C: 0.15-0.5%, Si: 0.1-0.5%, Mn: 0.5-3%, P<0.1%, S<0.05%, Al: 0.04-0.09%, Ti: 0.02-0.2%, B: 0.003-0.08%, Cr: 0.1-0.8%, and a balance of Fe and unavoidable impurities.

16. The differential-strength steel welded component with an aluminum or aluminum alloy clad layer according to claim 11, wherein the substrate of the low-strength steel plate consists of a composition based on weight percentage of C: 0.06-0.1%, Si: 0.06-0.2%, Mn: 0.5-1.5%, P<0.1%, S<0.05%, Al: 0.02-0.08%, Cr: 0.02-0.1%, Ti: 0.002-0.045%, and a balance of Fe and unavoidable impurities.

17. The differential-strength steel welded component with an aluminum or aluminum alloy clad layer according to claim 11, wherein the substrate of the low-strength steel plate consists of a composition based on weight percentage of C: 0.06-0.1%, Si: 0.06-0.2%, Mn: 0.5-1.5%, P<0.03%, S<0.005%, Al: 0.02-0.08%, Cr: 0.02-0.1%, Ti: 0.002-0.045%, and a balance of Fe and unavoidable impurities.

18. The differential-strength steel welded component with an aluminum or aluminum alloy clad layer according to claim 11, wherein the differential-strength steel welded component is an A-pillar, a B-pillar or a center tunnel of an automobile.

19. The differential-strength steel welded component with an aluminum or aluminum alloy clad layer according to claim 11, wherein the clad layer is an aluminum alloy and the aluminum alloy has a composition based on weight percentage of Si: 5-11%, Fe: 0-4%, and a balance of Al.

* * * * *